Jan. 25, 1938.  A. LEPETIT  2,106,460
OPTICAL DEVICE FOR MEASURING ANGLES, SUCH AS SEXTANTS
Filed March 13, 1937  4 Sheets-Sheet 2
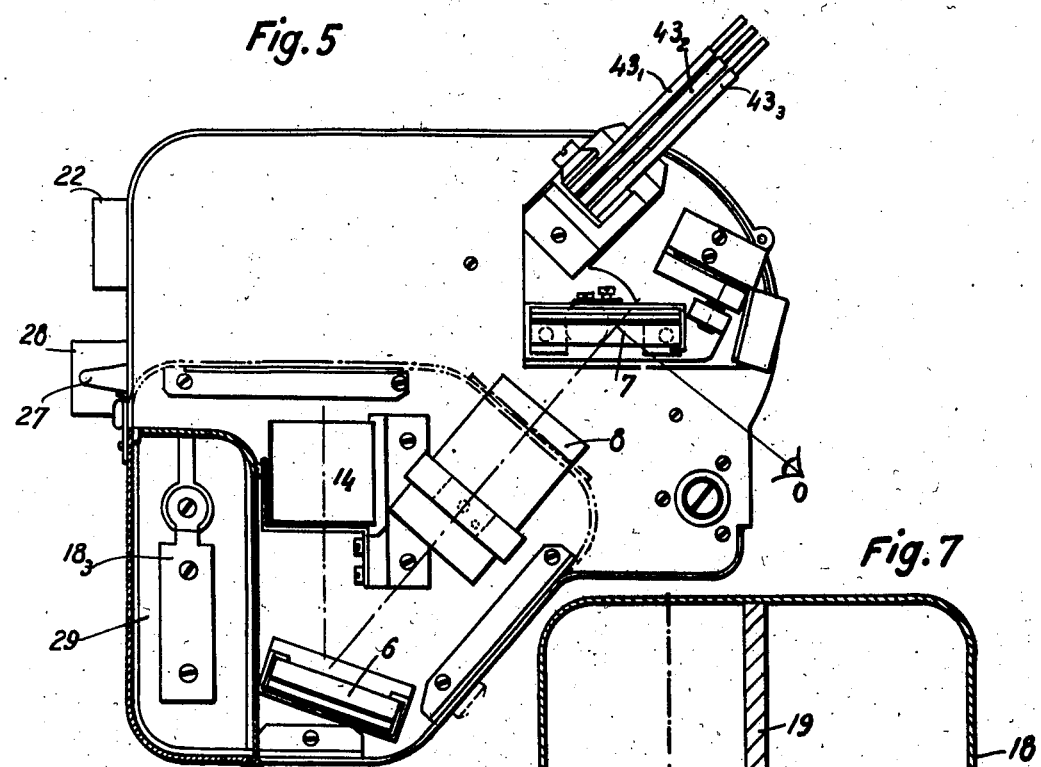
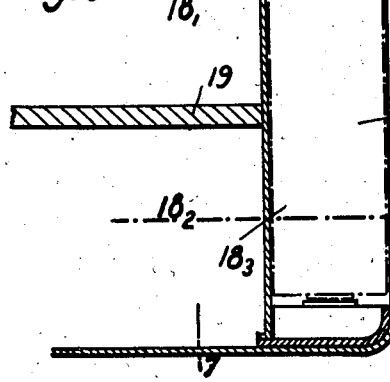
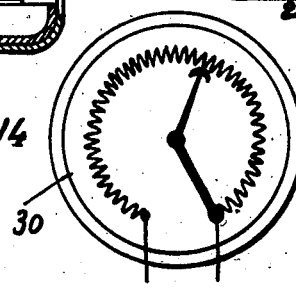
Inventor:
Albert Lepetit

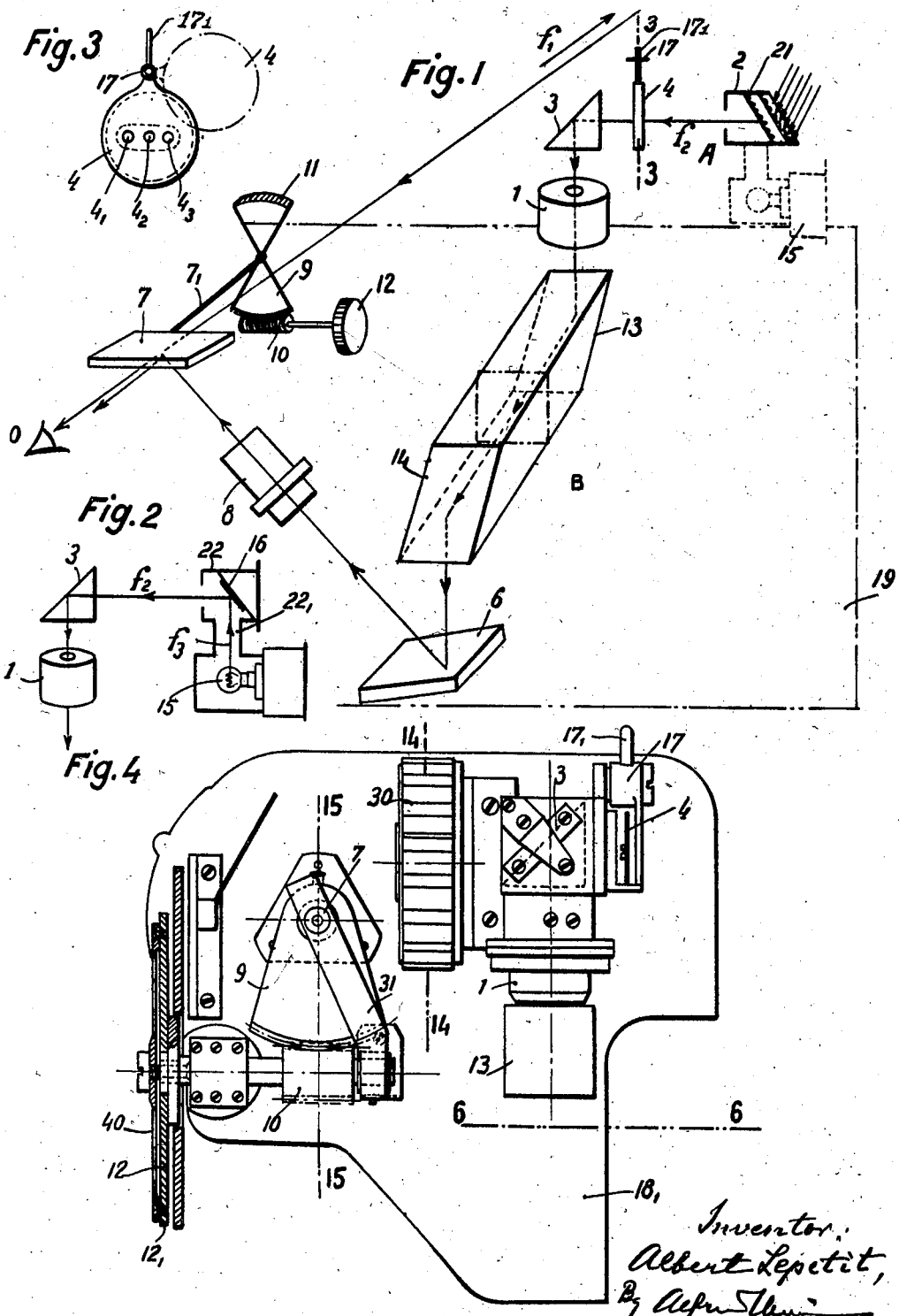

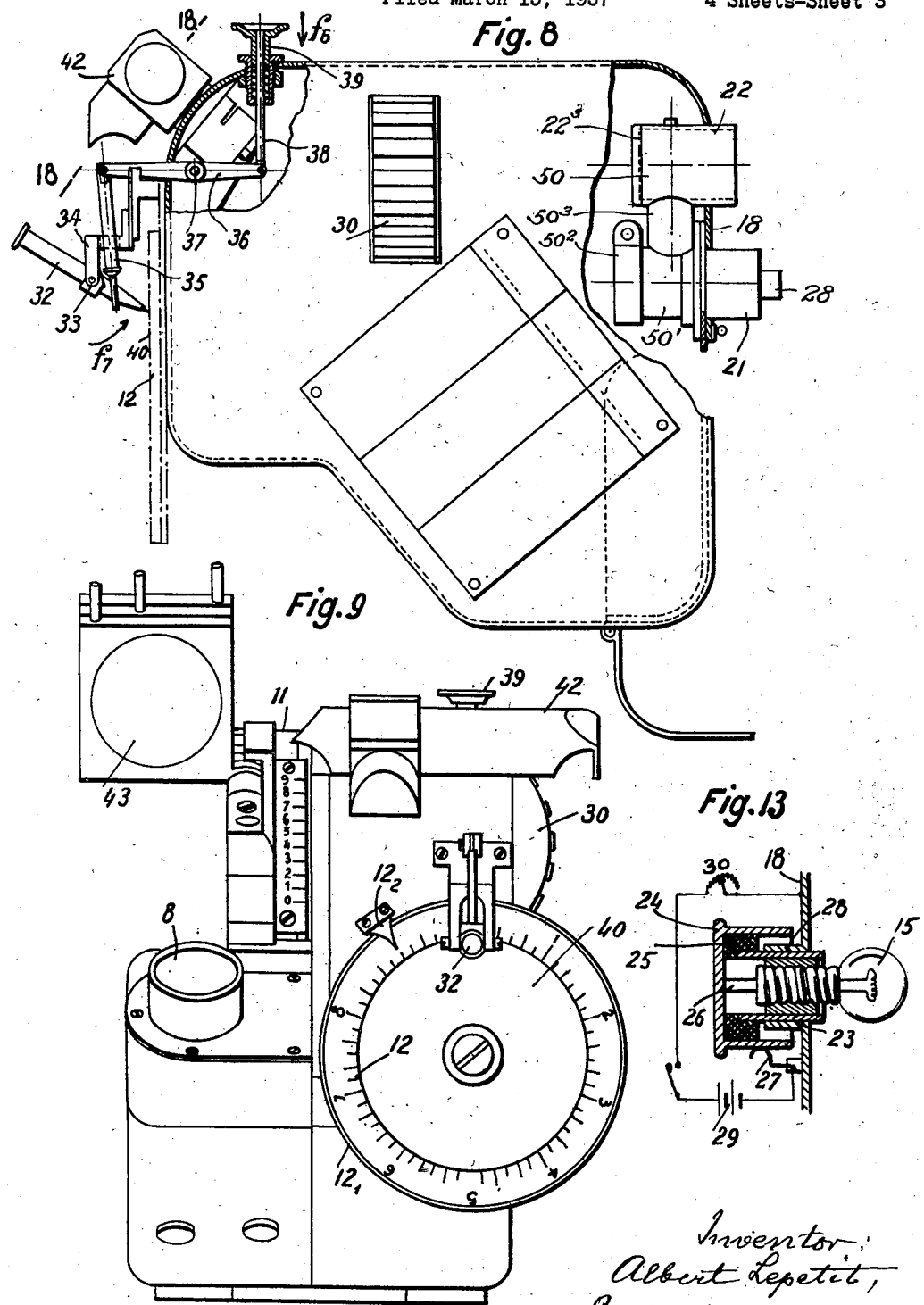

Jan. 25, 1938.  A. LEPETIT  2,106,460
OPTICAL DEVICE FOR MEASURING ANGLES, SUCH AS SEXTANTS
Filed March 13, 1937  4 Sheets-Sheet 4
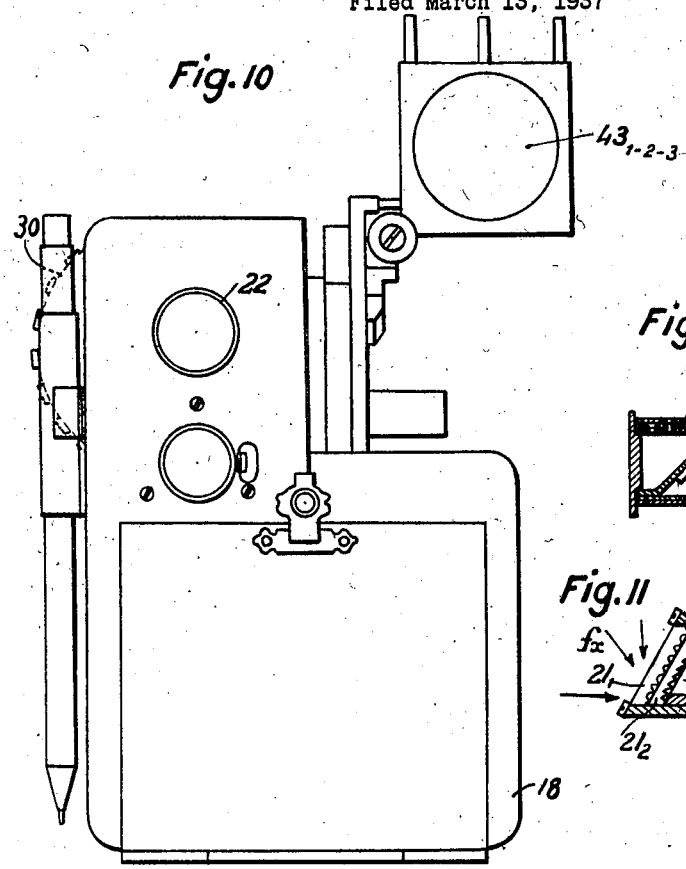
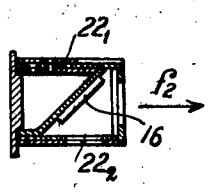
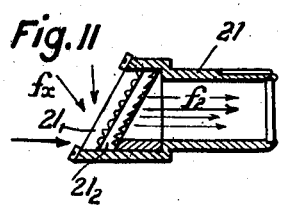
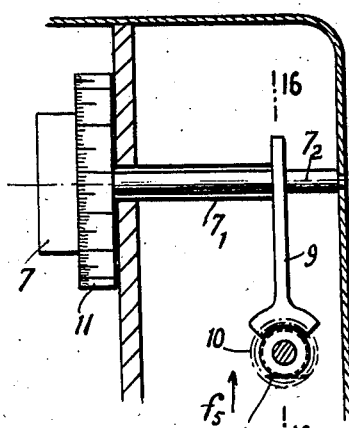
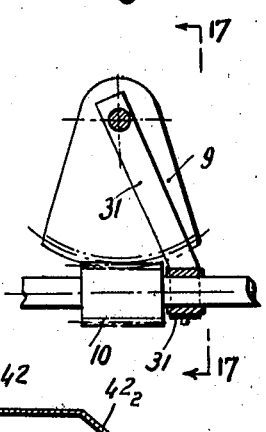
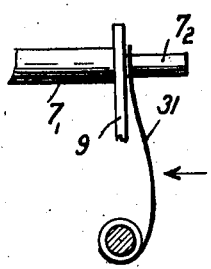
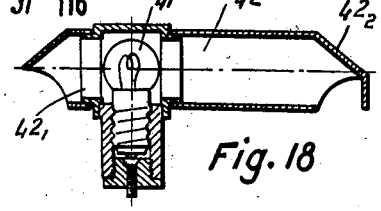

Patented Jan. 25, 1938

2,106,460

UNITED STATES PATENT OFFICE 2,106,460

OPTICAL DEVICE FOR MEASURING ANGLES, SUCH AS SEXTANTS

Albert Lepetit, Montrouge, France

Application March 13, 1937, Serial No. 130,653
In France March 16, 1936

4 Claims. (Cl. 88—2.4)

This invention has for its object improvements in and relating to optical devices for measuring angles, such as sextants.

The purpose of the improvements according to the invention is more particularly to increase the precision of optical devices adapted, in a general manner, for measuring angles, and to facilitate the use of the same.

A first object of the invention is to combine all the parts of the device in a unit requiring a minimum of space.

Another object of the invention is to arrange all the controlling parts of the device in order that they may be located immediately within reach of the fingers of the operator.

A device permitting of attaining the preceding objects comprises the features which appear from the following description as well as from the appended claims.

A preferred embodiment of the invention is shown by way of example in the accompanying drawings, in which Figure 1 is an optical diagram of the whole unit.

Figure 2 is a partial optical diagram showing the artificial illumination of the level.

Figure 3 is a partial sectional view along line 3—3 of Figure 1.

Figure 4 is a side view of the device, with the casing removed, showing the chamber which contains the level and the operating mechanism for the main mirror.

Figure 5 is another side view (with the casing removed) showing the optical system with the movable mirror.

Figure 6 is a partial cross sectional view along line 6—6 of Figure 4.

Figure 7 is a partial sectional view along line 7—7 of Figure 6.

Figure 8 is an outer side view with broken parts, showing more particularly the tracing device.

Figures 9 and 10 are a front elevational view and a rear elevational view respectively of the whole device.

Figures 11 and 12 are two axial sectional views of the illuminating devices for the le .

Figure 13 is another axial sectional view of one of the illuminating devices, showing the diagrammatical connections of the lamp.

Figure 14 is a partial sectional view along line 14—14 of Figure 4.

Figure 15 is a partial sectional view .ong line 15—15 of Figure 4.

Figure 16 is a partial sectional view along line 16—16 of Figure 15.

Figure 17 is a side view along line 17—17 of Figure 16, and

Figure 18 is a partial sectional view along line 18—18 of Figure 8.

The optical device shown in the accompanying drawings comprises two main groups of parts (Figure 1) which are located in two chambers designated A and B. Said chambers are provided in the same casing and separated from another by the partition 19.

The group in chamber A comprises the air-level 1 and its illuminating device 2—3—4—5 as well as the operating mechanism for the mirror.

The group in chamber B comprises the optical system which permits of bringing the image of the observed star to coincide with the image of the bubble of the air-level. This optical system comprises two mirrors 6—7 and an object-glass 8; for this purpose the second mirror 7 comprises a mechanism formed of a toothed sector 9 and a worm 10, the toothed sector 9 being fast on the rotation axis $7^1$ of the mirror 7. A drum 11, which is graduated in tens of grades and a knob 12, which is graduated in grades and minutes, permit of measuring the rotation of the mirror 7.

Lastly, an intermediate optical system formed, for instance, of two total reflecting prisms 13, 14 or of a single double reflecting prism, permits of causing the rays of light in the group of chamber A to pass into the group of chamber B.

The use of this device is as follows:

The observer places his eye at O in Fig. 1 and observes the star which is, for instance, in the direction $f^1$. At the same time he turns the mirror 7 by means of the mechanism 9, 10, 12 so that the image of the bubble of the level, which is successively reflected by the prisms 13 and 14 and the mirrors 6 and 7 coincides with the image of the star.

The observer repeats this observation several times for one and the same star; each time he makes an observation he traces a mark on a paper or celluloid sheet which is fast on the graduated knob 12 and he reads the graduation of the drum 11.

After he has made these various observations, the observer takes the mean of the readings which have been marked on the paper fast on knob 12; thus he obtains the mean height of the star in tens of grades, grades and minutes.

The same series of measurements can be made on a plurality of different stars.

The air-level 1 is formed so that the diameter of the bubble is practically invariable whatever the surrounding temperature may be. This property offers a great advantage through facilitating the measurements and their precision.

The level 1 is illuminated during the day by means of the device 2 which directs the rays of light onto a prism 3 which reflects them onto the level.

During the night, the device 2 is replaced by an electric lamp 15 (Figure 2) which illuminates the level 1 through the medium of a mirror 16 and the prism 3.

An operculum 4 is inserted in the way of the rays of light between the illumination device 2 and the level 1; said operculum 4 is provided with holes $4^1$ $4^2$ $4^3$ (Figure 3) which determine the line of sight through materializing the diameter of the bubble. The operculum 4 is pivotally mounted on an axis 14 so as to be able either to intersect the pencil of light which illuminates the level 1 for the observation during the night, or, on the contrary, to vanish and to free the pencil of light which illuminates the level during the day. The operation is made from the outside of the casing by means of a handle $17^1$ (see Figures 3 and 4).

Both positions of the operculum are shown, the one in full lines and the other in broken lines in Figure 3.

Figure 4 and the following figures show the material realization of the above mentioned scheme.

All the parts of the device are carried by a casing 18 which comprises two main chambers separated by a partition 19 (see Figures 4 to 7).

The chamber $18^1$ receives the parts of the group A, that is to say the air-level 1 with its illuminating device, the prism 13 and the operating mechanism for the mirror 7.

The chamber $18^2$ receives the optical system of group B, that is to say the prism 14, the mirror 6, the object-glass 5 and the swinging mirror 7.

The auxiliary optical system formed of the prisms 13, 14 or of a double reflecting prism deviates the pencil of light in order to bring the same into the optical plane of sight 20 (Figure 6) of the second chamber $18^2$; thus the optical transfer from the first chamber to the second chamber is insured.

The illuminating device of the level 1 comprises a mounting secured to casing 18 which mounting in turn comprises:

A fixed socket 22 open at the outside of the casing being seated in an opening provided in the wall of the casing and open to the interior of said casing through a window $22^3$.

A tubular element $50^1$ held by a collar $50^2$ and extending through the wall of casing 18 which is provided with a fixed central socket 28.

A tubular element $50^3$ connecting the socket 22 with the tubular element $50^1$.

A first removable socket 21 which carries striated glass-plates $21^1$ and $21^2$ which are inclined with respect to the axis of the said socket. The streaks of the glass pieces $21^1$ and $21^2$ act as multiple prisms so that the rays which fall onto the striated glass pieces $21^1$ and $21^2$ are reflected in a parallel relation with the axis along $f^2$ (Fig. 11) towards the level 1, whatever the incidence of the pencil of rays $fx$ (Figure 11) may be.

A second removable socket $22^1$ (Figure 12) is adapted to be substituted for the said first socket 21 for the illumination during the night; this second socket $22^1$ carries the mirror 16 which is located above a window 22 which receives the rays of light supplied by the electric lamp 15 (Figure 2). Thus, the second socket $22^1$ receives the rays coming from the lamp 15 along $f^3$ and leads them along $f^2$ (Fig. 12) toward the level 1.

The combination of both sockets 21, $22^1$ thus permits instantaneously to adapt the device to observations made with day-light or to observations which are made during the night with an artificial light.

An electric lamp 15 placed in a socket 23 (Figure 13) which is carried by a second socket 24 concentric with the first socket between which sockets is inserted an insulating material 25; both poles of lamp 15 are in electric contact with both concentric sockets 23, 24 either directly (in the case of socket 23) or by means of a rod 26 (in the case of socket 24).

The outer socket 24 engages a blade spring 27 which is insulated from the casing and thus supplies the current, while the inner socket 23 is in contact with the body through the medium of the fixed socket 28 on which said socket 23 is adapted; thus this inner socket 23 insures the completion of the circuit.

Through this arrangement any flying conductor for the connections is avoided, such a conductor being particularly troublesome in the use of devices of this kind.

In Figure 13 the battery 29 which supplies current to lamp 15 has been diagrammatically shown on the side of the said lamp 15.

In fact, this battery 29 is located in a third chamber $18^3$ of the casing 18, said chamber $18^3$ being located on the side of said first two chambers $18^1$, $18^2$ (Fig. 6).

The current supplied to lamp 15 is controlled by a rheostat 30 inserted between said lamp 15 and the battery 29 (Figures 4, 8, 9, 10, 13, and 14).

Thus the image of the level 1 and the image of the star can be caused to have the same brightness, which facilitates the measuring operations.

The mechanism comprising the worm 10 and the toothed sector 9 (Figures 1 and 4) and controlling the turning movement of mirror 7 for bringing the latter in the desired direction is combined with a wear compensation device formed of a spring 31 fast with a fixed axis $7^2$ which carries the toothed sector 9 (Figures 15 and 17); the spring 31 constantly urges the worm 10 along $f^5$ towards the teeth of the toothed sector. These various parts cooperate to insure the precision of the measurements whatever the direction of the operation may be.

On the other hand, the device for tracing the mark corresponding to a measure is made in the following manner:

A pencil or stylus 32 (Fig. 8) is pivotally mounted on an axis 33 carried by a blade spring 34 fast with the casing 18. A ball 35 pivotally connected to the end of a lever 36 engages this stylus 32; the lever 36, which is rockingly mounted on an axis 37 fast with casing 18 is again pivotally connected to the end of a rod 38 carrying a push button 39.

When this push button 39 is depressed along $f^6$ the stylus 32 swings along $f^7$ and traces a line on the paper 40 carried by the knob 12; during this swinging movement of stylus 32 the blade spring 34 yields so that the pressure of the stylus on the paper 40 remains constant; thus a regular line is obtained without the stylus 32 being likely to become damaged.

The knob 12 is knurled along $12^1$ in order to rotate the worm 10 and thereby operate mirror 7. The graduation of knob 12 moves in front of a fixed index 12² which is offset up to a known amount (one grade) with respect to the stylus.

The illumination of knob 12 is insured by a lamp 41 (Figures 9 and 18) located in an elongated casing 42 which comprises outer reflectors 42¹ and 42²; thus the lamp 41 insures the simultaneous illumination of knob 12 and the graduated drum 11 fast with the movable mirror 7.

The above described device is completed by a set of coloured screens 43¹ 43² 43³ which can be removed by a movement of rotation and which are inserted between the eye O and the observed star (sun), which permits of changing the character or the intensity of the light which is received.

A number of modifications can be made in the device which has been described above by way of example; more particularly the source of energy can comprise, instead of a battery as explained in the foregoing example, a flexible conducting cable with a contact plug adapted to be connected with an existing outer circuit.

Briefly stated, the above described arrangements permit of assembling in groups all the parts in a single unit requiring a minimum of space.

The said arrangements also facilitate the use of the device, for all the controlling parts (knurled knob 12, push button 39 of stylus 32, buttons of the illuminating devices, rheostat and the like) are arranged immediately within reach of the fingers of the observer, which permits of an easy use of the device without the observer having to move his hands with which he holds the device.

I claim:

1. In an optical device for measuring angles such as a sextant: a casing, an air-level mounted in said casing, a source of current mounted in said casing, electrical connection means carried by said casing and comprising a socket electrically connected with one of the poles of the source of current and a blade spring attached to said casing and insulated therefrom and electrically connected with the other pole of the source of current, an illuminating device for the night secured on casing, said device comprising an electric lamp connected with two concentric sockets insulated one from another, one of the said sockets electrically engaging said first mentioned socket, while the other socket engages said blade spring, said illuminating device illuminating said air-level, an optical device mounted in said casing receiving and directing the image of the bubble of said air-level, and a control mechanism mounted on said casing and controlling said optical device.

2. In an optical apparatus for measuring angles such as a sextant, a casing, an air level provided in said casing, a mounting secured to said casing and comprising a fixed socket and illuminating tube for the night, a removable socket for daylight adapted to be mounted in said fixed socket, inclined striated glass plates secured in said removable socket, constituting multiple prisms for collecting the luminous solar rays and directing them to said air level, an optical device mounted in said casing for receiving and directing the image of the bubble of said air level, and a control mechanism provided on said casing and controlling said optical device.

3. In an optical apparatus for measuring angles such as a sextant, a casing, an air level provided in said casing, a mounting secured to said casing and comprising a fixed socket and illuminating tube for the night, a removable socket for night illumination adapted to be mounted in said fixed socket and having a window provided in its wall, an inclined mirror provided in said removable socket, an illuminating device for the night provided in said illuminating tube for directing the light rays onto said air level through said window and said inclined mirror, a source of current provided in said casing for supplying current to said illuminating device, an optical device provided in said casing for receiving and directing the image of the bubble of said air level, and a control mechanism mounted in said casing for controlling said optical device.

4. In an optical apparatus for measuring angles such as a sextant, comprising a casing, an air level provided in said casing, a mounting secured to said casing and comprising a fixed socket and illuminating tube for the night, a removable socket for night illumination adapted to be mounted in said fixed socket and having in its wall a window, an inclined mirror provided in said removable socket, an illuminating device for the night provided in said illuminating tube for directing the light rays onto said air level through said window and by means of said mirror, a source of current provided in said casing supplying current to said illuminating device, an operculum having apertures pivoted on said casing and adapted to be placed between said air level and said illuminating device, an optical device mounted in said casing for receiving and directing the image of the bubble of said air level, and a control mechanism provided in said casing for controlling said optical device.

ALBERT LEPETIT.